United States Patent
Kim

(10) Patent No.: US 7,047,283 B1
(45) Date of Patent: May 16, 2006

(54) APPARATUS AND METHOD OF UPGRADING PROGRAM OF FIRMWARE BOARD

(75) Inventor: Jung-Gi Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1063 days.

(21) Appl. No.: 09/591,245

(22) Filed: Jun. 9, 2000

(30) Foreign Application Priority Data

Jun. 9, 1999 (KR) ............................... 1999-21353

(51) Int. Cl.
G06F 15/177 (2006.01)
G06F 9/44 (2006.01)

(52) U.S. Cl. ........................... 709/220; 717/168; 713/2

(58) Field of Classification Search ................ 709/200, 709/201, 202, 203, 220, 221, 217; 717/171, 717/168, 178; 711/103; 710/1
See application file for complete search history.

(56) References Cited

U.S. PATENT DOCUMENTS

| | | | | |
|---|---|---|---|---|
| 5,603,056 A | * | 2/1997 | Totani | 710/8 |
| 5,689,640 A | * | 11/1997 | Okanoue | 709/221 |
| 5,740,178 A | * | 4/1998 | Jacks et al. | 714/722 |
| 5,828,911 A | * | 10/1998 | Miyazawa | 396/236 |
| 5,878,256 A | * | 3/1999 | Bealkowski et al. | 713/2 |
| 6,009,497 A | * | 12/1999 | Wells et al. | 711/103 |
| 6,055,632 A | * | 4/2000 | Deegan et al. | 711/112 |
| 6,195,511 B1 | * | 2/2001 | Harada | 396/300 |
| 6,209,127 B1 | * | 3/2001 | Mori et al. | 717/162 |
| 6,272,587 B1 | * | 8/2001 | Irons | 711/103 |
| 6,275,931 B1 | * | 8/2001 | Narayanaswamy et al. | 713/2 |
| 6,317,827 B1 | * | 11/2001 | Cooper | 713/2 |
| 6,343,379 B1 | * | 1/2002 | Ozawa et al. | 725/63 |
| 6,357,021 B1 | * | 3/2002 | Kitagawa et al. | 714/41 |
| 6,438,643 B1 | * | 8/2002 | Ohara et al. | 711/103 |
| 6,526,092 B1 | * | 2/2003 | Nelson et al. | 375/222 |
| 6,601,212 B1 | * | 7/2003 | Guha et al. | 714/776 |
| 6,615,404 B1 | * | 9/2003 | Garfunkel et al. | 717/173 |
| 6,622,246 B1 | * | 9/2003 | Biondi | 713/100 |

FOREIGN PATENT DOCUMENTS

WO WO 96/02034 * 1/1996

* cited by examiner

*Primary Examiner*—Dung C. Dinh
*Assistant Examiner*—Aaron Strange
(74) *Attorney, Agent, or Firm*—Cha & Reiter, L.L.C.

(57) ABSTRACT

A program on a firmware board is upgraded without cutting off power or resort to additional firmware writing hardware by providing the board with a flash memory which stores a file for production and a production-processing program for updating the file. A host computer produces the file for production by converting an execution file prepared in advance into the file for production. A personal computer (PC) receives the file for production downloaded from the host computer and stores the downloaded file for production in the corresponding region of the flash memory. The PC stores the file for production in the corresponding region of the flash memory using the production-processing program.

4 Claims, 6 Drawing Sheets

APPARATUS AND METHOD OF UPGRADING PROGRAM OF FIRMWARE BOARD

CLAIM OF PRIORITY

This application makes reference to, incorporates the same herein, and claims all benefits accruing under 35 U.S.C. Section 119 from an application for PROGRAM UPGRADING APPARATUS AND METHOD FOR FIRMWARE BOARD filed earlier in the Korean Industrial Property Office on Jun. 9, 1999 and there duly assigned Serial No. 21353/1999.

BACKGROUND OF THE INVENTION

1. Field of the Invention

The present invention relates generally to a firmware board having an incorporated function program stored in a non-volatile memory. More particularly, the present invention relates to an apparatus and method for upgrading the function program of the firmware board.

2. Description of the Related Art

Typically, a firmware board is provided with an erasable and programmable read only memory (EPROM), an electrical erasable and programmable read only memory (EEPROM), and other non-volatile memory to store pre-programmed boost-up data (i.e. firmware) relevant to establish information or configuration therein. The EPROM, which stores the program, is manufactured using an EPROM writer, then the manufactured EPROM is superimposed on the nonvolatile memory of the firmware board to drive the firmware board. As occasion demands, the program for driving the firmware board is upgraded.

However, the prior art system of upgrading the program for driving the firmware board has drawbacks. The first drawback is that it requires additional hardware, i.e., the EPROM writer itself. The second drawback is that it is inefficient and inconvenient as the EPROM already packaged on the firmware board must be physically removed from the backbone while the power of the firmware board is turned off to replace the old EPROM with a newly manufactured EPROM.

SUMMARY OF THE INVENTION

Accordingly, the present invention has been made in an effort to solve the problems occurring in the related art, and therefore, an object of the present invention is to provide an apparatus and method for upgrading the program for driving a firmware board without using a separate tool, such as the EPROM writer.

It is another object of the present invention to provide an apparatus and method for upgrading the program for driving a firmware board that can eliminate the intervention to the hardware by the end user when upgrading the program.

It is still another object of the present invention to provide an apparatus and method for upgrading the program for driving a firmware board so that the program can be more easily upgraded by simply downloading new firmware data to acquire new capabilities.

In order to achieve the above objects in the embodiments of the present invention, the program of the firmware board can be upgraded by the built-in program and protocol without turning off the power of the firmware board and without using a separate hardware tool, such as an EPROM writer.

According to the present invention, a flash memory is provided on a firmware board to store the program for production. A host computer creates a file for production by converting an execution file, prepared in advance, into the file for production. A personal computer (PC) receives the production file from the host computer by downloading therefrom, and the PC stores the production file in the corresponding region of the flash memory using a production-processing program of the firmware board.

BRIEF DESCRIPTION OF THE DRAWINGS

The above objects and advantages of the present invention will become more apparent by describing in detail the preferred embodiment thereof with reference to the attached drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
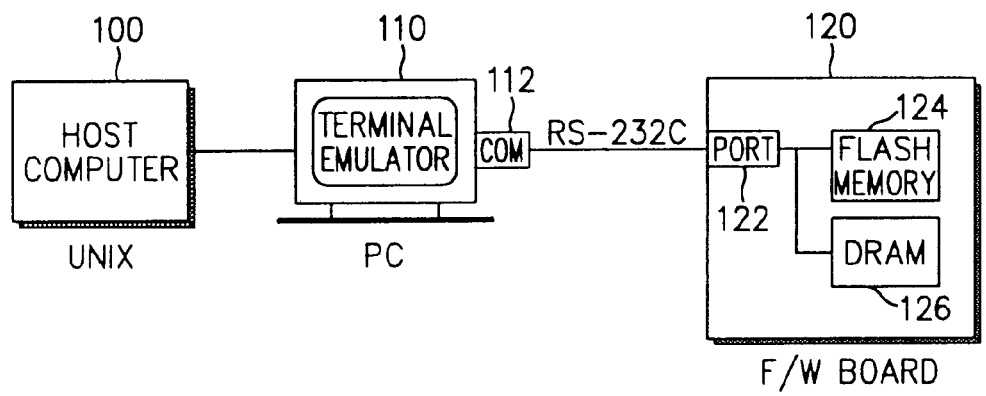
FIG. 1 is a block diagram illustrating the construction of an apparatus for upgrading the program for driving the firmware board according to the present invention.

FIG. 1 depicts a block diagram illustrating the construction of an apparatus according to the present invention for upgrading the program for driving the firmware board. The upgrading apparatus employs a flash memory 124 in which a data read/write operation is performed utilizing software for storing the program with new capabilities onto a firmware board 120, instead of replacing the EPROM as in the prior art.

With reference to FIG. 1, a host computer 100, which operates under the control of an operating system, converts an execution file prepared in advance by a programmer into a file for production by converting the object codes into an appropriate format to be stored in the firmware board. Here, the host computer 100 can be a UNIX system. The execution file includes program object codes for upgrading the program that are used for driving the firmware board. The host computer 100 creates the file for production using a software known as a "SIGX2B" execution program to convert the program object codes into the file for production.

It should be noted that within this disclosure, the term personal computer (PC) is meant broadly to refer to any type of programmable terminal—i.e., notebook PC, cellular phones, digital cameras, or other small-size information apparatus.

A personal computer (PC) 110 downloads the production file created by the host computer 100 and stores the production file in a corresponding region of the flash memory 124 of the firmware board 120. In order to actuate the transfer, the PC 110 is provided with a communication (COM) port 112 for loading the production file to the firmware board 120. The communication port 112 is connected to the input/output port 122 of the firmware board 120 through an RS-232C line. Here, the terminal emulator of the PC 110 performs the transmission of the file through the communication port 112.

The firmware board 120 is provided with a non-volatile memory, flash memory 124, in which the data read/write is possible using software and stores the drive program therein. That is, the flash memory 124 stores the production-processing program, which is stored initially in the flash memory 124 using an EPROM writer, and thereafter, the program production/upgrading is performed in a manner that any program is stored in the flash memory 124 using the production-processing program. The production-processing program receives the file which was converted to the production format using the "SIGX2B" program from the PC 110 and saves it onto the flash memory 124. Then, after upgrading with the new program, the boost-up program boots this new file stored in the flash memory 124. Accordingly, the PC 110 can upgrade the program stored in the flash memory 124 using the production-processing program.

Moreover, in the embodiment of the present invention, the firmware board 120 includes a Dynamic Random Access Memory (DRAM) 126. If the file for production created by the host computer 100 corresponds to the file for upgrading the production-processing program, the production process is performed by copying the production-processing program from the flash memory 124 onto the DRAM to perform the upgrading process therein, then the upgraded production-processing program is stored back into to the flash memory 124 again. For upgrading the operation, the embodiment is provided the DRAM 126. It should be noted that a Static Random Access Memory (SDRAM) can be also used.

Figure 2:
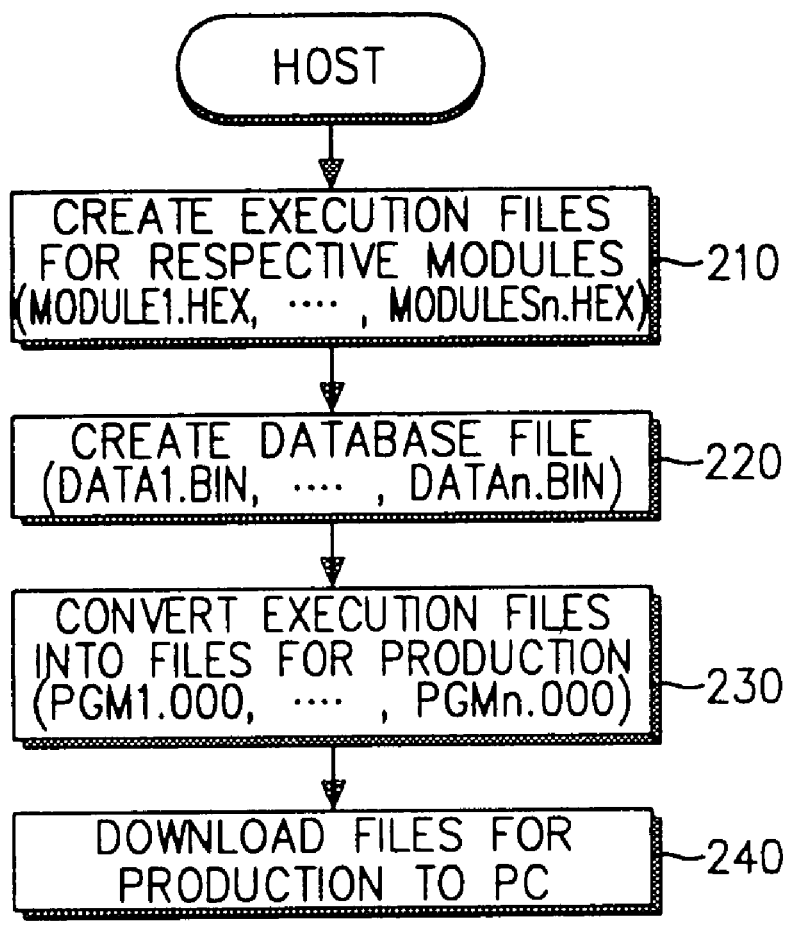
FIG. 2 is a flowchart illustrating a file creating process according to the present invention.

FIG. 2 is a flowchart illustrating a process of creating a file for a production performed by the host computer 100 according to the present invention. The following will be a general discussion of the present invention in the context of a software related to the PC and the firmware. It is to be understood that the software and hardware can take many different configurations such as is within the skill of those skilled in the art.

With reference to FIG. 2, the host computer 100 creates an execution file by compiling/linking operating programs, MODULE 1, HEX, . . . , MODULE n, HEX, for respective modules in step 210. Then, the host computer 100 creates database files, DATA 1, BIN, . . . , DATA n, BIN, in step 220. Thereafter, in step 230, the host computer 100 converts the respective execution files created in step 220 into files for production, PGM 1, 000, . . . , PGM n, 000, using a "SIGX2B.EXE", which is a tool for creating the files for production. At this time, the files for production are created after a file of ".ITC.INI" is executed. However, the ITC.INI is a normal test file which can be produced using any editor program and is created before the production file is made. The ".ITC.INI" is an input data file for "SIGX2B.EXE" and notifies the "SIGX2B.EXE" with the configuration and method for making a production file. Thus, the ".ITC.INI" file is a file which clarifies the production guide to the production file and includes information on storage regions, booting, etc., of the flash memory 124. This information is contained in the header portion of the production file. Input parameters can be set by an operator using a single, .INI file to specify application parameters and defines the starting parameters for the system. That is, the .INI file specifies the application, services, driver letter, program, install file, set-up program, memory space, user name, and/or message type. In step 240, the file for production created in step 230 is downloaded to the PC 110.

As described above, the "SIGX2B" execution file is a tool for creating S-record files and binary files as production files. When creating the production files, it follows instructions recorded in the .INI file. Thus, by executing the "SIGX2B package name .INI", the files for production are created.

Figure 3:
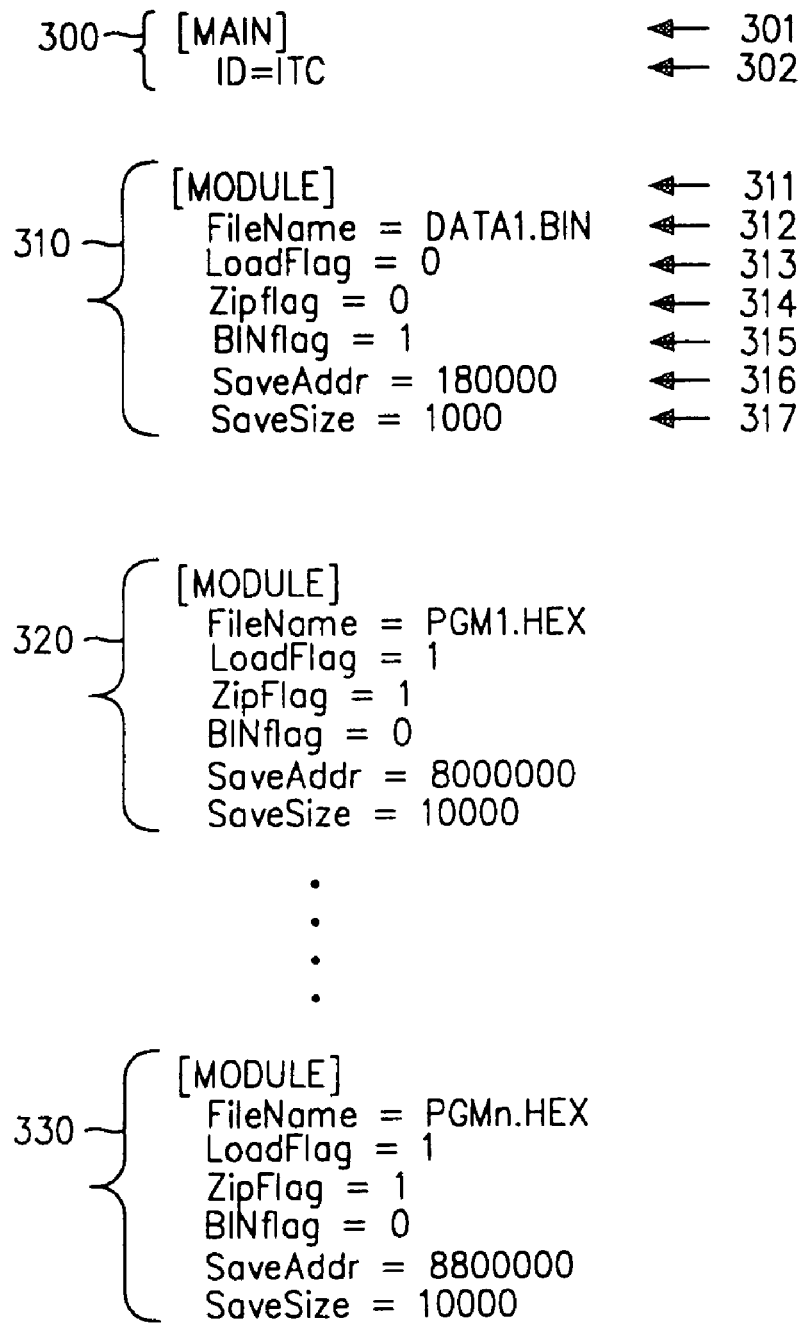
FIG. 3 is a view explaining the structure of an .INI data file used for creating the file for production according to the present invention.

FIG. 3 is a view explaining the structure of the .INI data file used for creating the production file according to the present invention. This .INI data file is an input text file of the "SIGX2B" execution file. A list of files which constitute a package for production and commands for the package construction are recorded in the .INI data file.

INI File Parameter

1. Reference number, 300, denotes a region where information related to the firmware board is stored.
2. Reference number, 301, denotes an information tag related to the firmware board.
3. Reference number, 302, denotes a package identifier of a fixed value, i.e., the name of the firmware board.
4. Reference numbers, 310, 320, and 330, denote regions where information related to respective modules/components of the firmware board is stored.

As information related to the respective modules can be stored in the same manner, only the first module 310 will be explained as an illustrative example hereinafter.

5. The reference number, 311, denotes an information tag related to a module (MODULE).
6. The reference number, 312, denotes a file name of modules (File Name) which constitutes a package.
7. The reference number, 313, denotes the booting state of the file (LoadFlag). For example, "0" represents that the file has not been booted and "1" represents that the file has been booted.
8. The reference number, 314, represents the type of file stored in the flash memory 124. For example, "0" represents that the file is of a non-compressed type and "1" represents that the file is of a compressed type.
9. The reference number, 315, represents the type of an input file (BINflag). For example, "0" represents an S-record file and "1" represents a binary file.
10. The reference number, 316, represents the position (unit of 64 Kbytes) of the flash memory 124 where the file is stored (SaveAddr).
11. The reference number, 317, represents the maximum size of a resultant file (SaveSize). If the resultant file exceeds 64 Kbytes, it is created as "*.000, *.001".

Figure 4:
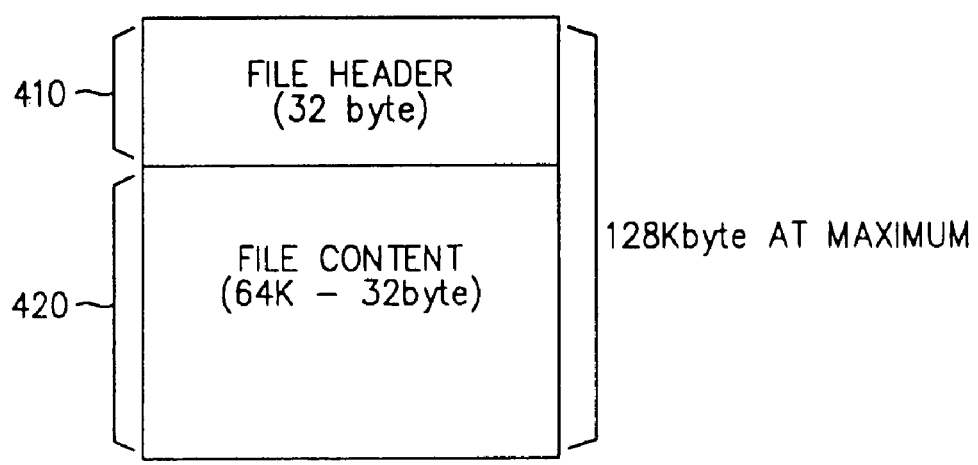
FIG. 4 is a view illustrating the structure of the file for production that is created according to the present invention.

FIG. 4 is a view illustrating the structure of the production file created according to the present invention. The production file is created through the process as shown in FIG. 2.

With reference to FIG. 4, the file for production comprises a file header 410, and file content 420. The file header 410 is composed of 32 bytes, and the file content 420 is composed of 64 Kbytes—32 bytes. The production file can have the size of 128 Kbytes at maximum. The file content 420 can be a compressed type according to ZipFlag of the .INI file.

Figure 5:
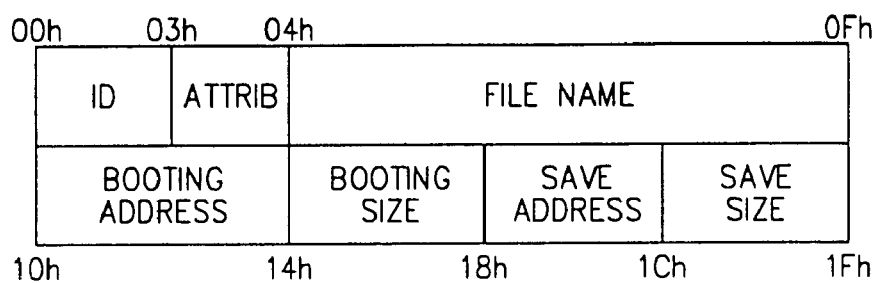
FIG. 5 is a view illustrating the structure of a header of the file for production created according to the present invention; and, FIG. 6 is a flowchart illustrating the process of transmitting the file for production onto the firmware board and for storing the file for production in the corresponding region of a flash memory according to the present invention.

FIG. 5 is a view illustrating the structure of the header of the production file created according to the present invention (i.e., the structure of the file header 410 of FIG. 4).

With reference to FIG. 5, the header 410 of the file for production comprises "ID (00h~03h)", "ATTRIB (03h~04h)", "FILE NAME (04h~0Fh)", "BOOTING ADDRESS (10h~14h)", "BOOTING SIZE (14h~18h)", "SAVE ADDRESS (18h~1Ch)", and "SAVE SIZE (1Ch~1Fh)".

Header Parameters
1. The "ID" represents the package identifier and indicates the ID) of the .INI file.
2. The "ATTRIB" represents the attributes of the file that exist in the .INI file. At this time, "bit 0" represents the booting state and "bit 1" represents the compression state.
3. The "FILE NAME" represents the file name of a module that exists in the .INI file.
4. The "BOOTING ADDRESS" represents the position where the corresponding file is booted and extracted from the execution file.
5. The "BOOTING SIZE" represents the booting size of the corresponding file that is extracted from the execution file.
6. The "SAVE ADDRESS" represents the position of the flash memory 124 where the content of the corresponding file is stored.
7. The "SAVE SIZE" represents the size of the content of the corresponding file.

Figure 6:
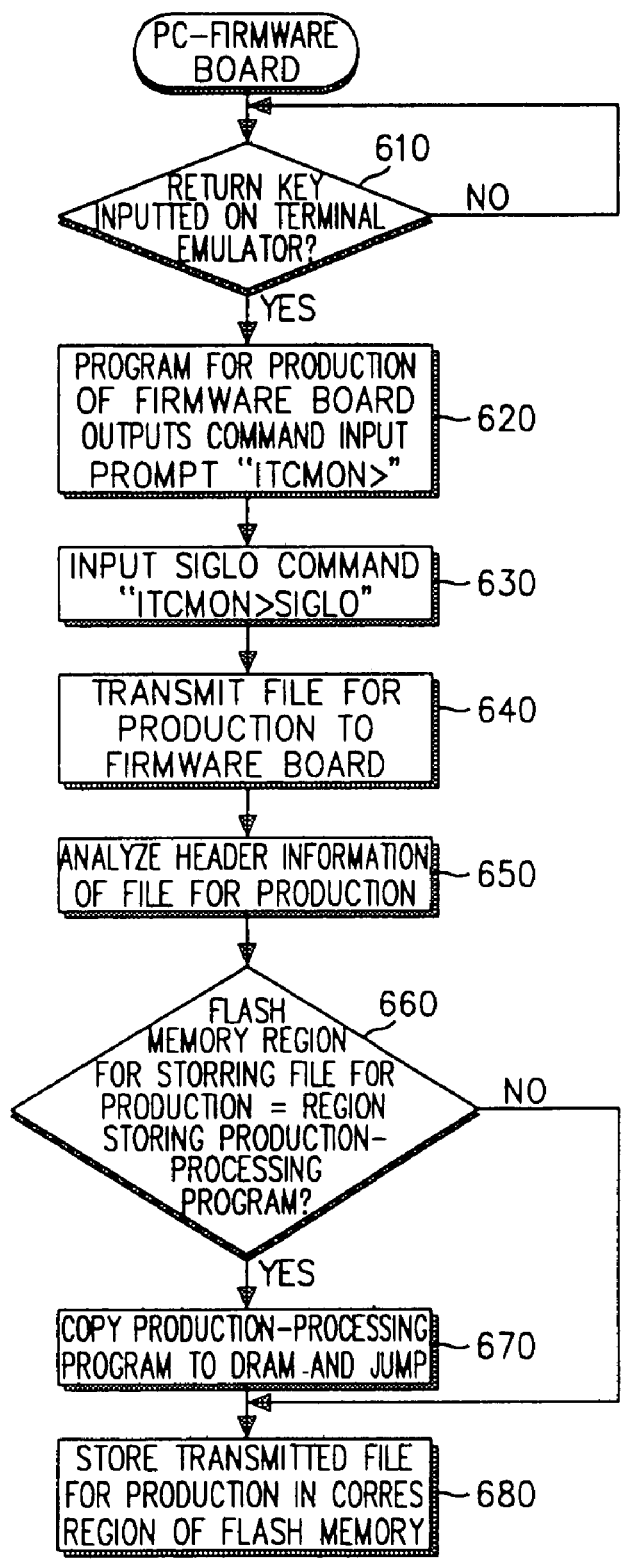

FIG. 6 is a flowchart illustrating the process of transmitting the production file created according to the present invention to the firmware board and for storing the production file in the corresponding region of the flash memory. This process is performed by the terminal emulator of the PC and the production-processing program of the firmware board 120 using the production file that is downloaded from the host computer 100.

If an operator inputs a command through the PC 110 to transmit the file for production, i.e., if the operator enters a return key on the terminal emulator of the PC 110 (step 610), the PC 110 connects a communication path to the production-processing program of the firmware board 120 through the RS-232C communication line using the terminal emulator. In response to the input of the return key, the production-processing program outputs a command input prompt to display "ITCMON>" on a display screen of the PC 110 (step 620). In response to the display of "ITCMON>" on the display screen of the PC 110, the user may enter a SIGLO command, i.e., a command for transmitting the file for production. If so, "ITCMON>SIGLO" is displayed on the screen of the PC 110 (step 630). The PC 110, in response to the input of the command for transmitting the file for production, transmits the production file to the firmware board 120 (step 640).

The production-processing program of the firmware board 120 receives the production file transmitted from the PC 110 and analyzes the header information of the received file for producing (step 650), then stores the production file in the corresponding region of the flash memory 124 according to the analysis result (step 660). At this time, if the region of the flash memory 124 where the production file is to be stored is the region where the production-processing program is stored—i.e., if the production-processing program itself is to be updated —the production-processing program copies its own program to the DRAM 126, jumps to the DRAM 126, then performs the production-process on the DRAM 126 (step 670). That is, the updating of the production-processing program is performed in the DRAM 126. If the updating of the production-processing program is completed, the updated production-processing program is stored back in the corresponding region of the flash memory 124 (step 680).

As described above, according to the present invention, a firmware program is upgraded by a production-processing program stored in a firmware board, and thus a separate hardware tool such as an EPROM writer is not required. In other words, the program of the firmware board can be upgraded only by the replacement of an operating program in the flash memory and not by the hardwired replacement of the EPROM. Thus, the program of the firmware board can be upgraded without turning off the power supply to the firmware board. Moreover, as the upgrading of the firmware program can be achieved independently from an upper system where the firmware board is packaged and the upgrading is performed only for the module that requires the upgrading, the inconvenience of replacing the EPROM, which stores the programs of the whole firmware board, can be prevented.

Further, the present invention has advantages in that module execution files can be freely positioned in the desired region of the flash memory using the tool (SIGX2B) by converting the execution files prepared by a programmer into the production files using the .INI file for specifying the configuration of production. Also, the present invention have advantage of using the firmware board without regards to the operation type of the firmware board since the booting status and the booting address can be designated in the event that the firmware board operates not only directly on the flash memory but also through booting the DRAM.

The previous description of the preferred embodiments is provided to enable any person skilled in the art to make or use the present invention. The various modifications to these embodiments will be readily apparent to those skilled in the art. Thus, the present invention is not intended to be limited to the embodiments shown herein but is to be accorded the widest scope consistent with the principles and novel features disclosed herein. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for upgrading the operating system firmware of a personal computer system by downloading an updated firmware to acquire new capabilities, comprising:
   a host computer for converting an execution file prepared by an operator into said updated firmware;
   at least one personal computer coupled to said host computer for receiving said updated firmware downloaded from said host computer;
   a firmware board having:
   a communication interface means connected for communicating with said personal computer and for transferring data between said personal computer and said firmware board;
   a first memory means coupled to said communication means for storing a boot program, operating codes, and said operating system firmware; and
   a second memory means coupled to said first memory means for storing a copy of information stored in said first memory means to be replaced with said updated firmware; wherein said personal computer is further operable for transmitting to the firmware board said updated firmware downloaded from said host computer and wherein, based on an analysis of the transmitted firmware by a production-processing program in said first memory means, the production-processing program operates in either the first or second memory means in storing the transmitted firmware into a corresponding region of said first memory means, wherein said host computer is further configured for attaching a storage address information of said first memory means to said updated firmware.

2. A method for upgrading the program of a firmware board comprising the steps of:
  providing a flash memory in the firmware board for storing a production-processing program;
  creating, by a host computer, a file for production by converting an execution file prepared in advance into the file for production;
  receiving, by a personal computer (PC), the file for production, downloaded from the host computer; and,
  storing file for production in a corresponding region of the flash memory,
  wherein the method further comprises the step of duplicating the production-processing program in an externally connected DRAM/SRAM while upgrading the production-processing program in the DRAM/SRAM, wherein the file for production includes a header portion containing a storage address of the flash memory, a compression state, and a booting state for the production file.

3. The method as claimed in claim 2, wherein the PC transmits the file for production to the flash memory when a transmission command is inputted thereto.

4. An apparatus for replacing, with a newer version, a program stored in a firmware board, said apparatus comprising:
  a host computer for converting an execution file prepared by an operator into a file for production;
  a flash memory disposed in the firmware board for storing a production-processing program;
  a personal computer (PC) for receiving the file for production downloaded from the host computer and for storing the file for production, as said newer version, in a corresponding region of the flash memory; and
  a DRAM for storing a copy of the production-processing, program from the flash memory when upgrading the production-processing program so that said upgrading can be performed in the DRAM;
wherein the PC stores the file fore production in the flash memory using the production-processing program in the flash memory, wherein the host computer, in creating the file for production, attaches a storage address of the flash memory, a compression state, and a booting state for the production file.

* * * * *